June 14, 1927.

F. A. HUBBARD 1,632,076

METHOD OF DETERMINING INEQUALITIES IN WALL THICKNESS OF TUBES

Filed April 22, 1925

Inventor:
Francis A Hubbard
by E.W. Adams, Atty.

Patented June 14, 1927.

1,632,076

UNITED STATES PATENT OFFICE.

FRANCIS A. HUBBARD, OF WYOMING, NEW JERSEY, ASSIGNOR TO WESTERN ELECTRIC COMPANY, INCORPORATED, OF NEW YORK, N. Y., A CORPORATION OF NEW YORK.

METHOD OF DETERMINING INEQUALITIES IN WALL THICKNESS OF TUBES.

Application filed April 22, 1925. Serial No. 24,948.

This invention relates to a method of determining the variations in thickness of the walls of metallic tubes or pipes and more especially to a method of determining the variations in thickness of the sheath of lead covered cable.

Heretofore, in sheathing cables with lead, trouble has been experienced due to the core being eccentric with the sheath as it comes from the lead press. To overcome this trouble it has been necessary to use a sufficiently thick lead coating so that when the thickness varied, the minimum coating obtained would be sufficient for all purposes.

The present invention, by determining the variations in the sheath thickness as the cable comes from the lead press, affords a means of effecting considerable saving in the amount of lead used since any variation can immediately be taken care of by adjusting the temperature of the molten lead and the normal thickness of the lead sheath thereby decreased.

To accomplish this, the present invention makes use of the distribution of current in a conductor, the cross section of which is not symmetrical. It is well known that electric current in such a conductor will distribute itself in such a way that the current density in any cross section is uniform; in other words, the amount of current flowing in any part is proportional to the thickness of that part. The distribution of the magnetic field about such a conductor will correspond with the distribution of the current in that section.

If the current passing through the conductor is alternating, the magnetic field will also alternate and coils of wire introduced into this magentic field will have voltages induced in them, the strength of which will depend upon the strength of the magentic field.

It has been found that alternating current having a relatively low frequency, for example 60 cycles is best suited for this purpose. A measure of the voltage in the coils introduced into the field will determine the asymmetry in the thickness of the conductor in each section.

Figure 1:
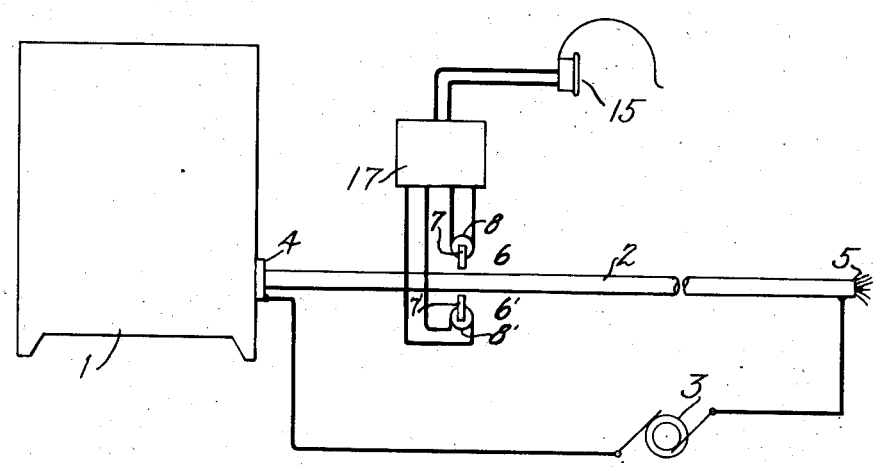
Figure 2:
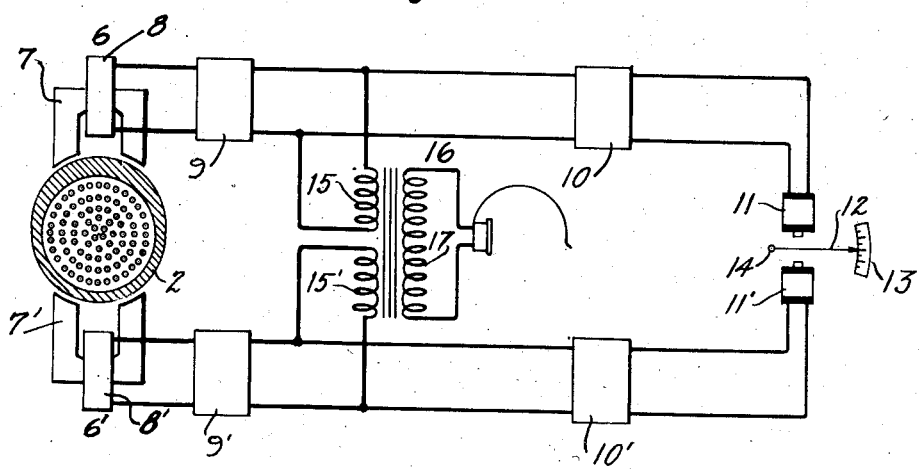

This method will be better understood from the following description taken in connection with the attached drawing in which Fig. 1 shows a general schematic view of the method of applying alternating current to the cable sheath and the general arrangement of the detecting coils, while Fig. 2 shows on a larger scale and in somewhat more detail the apparatus used.

Referring to Fig. 1, the lead press is designated by 1 from which is being extruded lead covered cable 2. A source of alternating current 3 impresses on cable 2 a current having a frequency of approximately 60 cycles. One wire from this source is attached to the outlet 4 of the lead press so that electrical connection is made between this wire and the cable, the other wire being connected to the cable by means of a contact at some point such as 5.

Two exploring coils 6 and 6' having cores 7 and 7' and coils of wire 8 and 8', respectively, are placed adjacent the outlet of the lead press and are arranged so that they may be moved about the cable in either direction approximately 180 degrees. The current induced in the exploring coils is amplified in the well known manner by amplifiers represented by 9 and 9' (Fig. 2) and then rectified by rectifiers 10 and 10'. The corresponding rectified currents then pass through electromagnetic devices 11 and 11' placed adjacent each other and having a common armature 12 between them as shown in Fig. 2. This armature is pivoted at 14 and coacts with a scale 13. In Fig. 1, the amplifier, rectifiers, and detector are represented generally at 17.

In operation, the alternating current, as pointed out above, passes through the sheath, sets up a magnetic field about the sheath which magnetic field induces voltages in the exploring coils. If the thickness of the sheath is uniform so that voltages of equal intensity are set up in the exploring coils, magnets 11 and 11' (Fig. 2) will be energized with equal currents and since these magnets are identical, the attractive forces exerted on armature 12 will be equal, so that the armature will float and the pointer will be at the mid-point of the scale. If, however, the cable sheath 2 is thicker in the upper portion, as shown in Fig. 2, more current will flow in this section increasing the magnetic field near it inducing in coil 6, voltages of greater magnitude than those induced in coil 6'. These induced voltages are amplified and rectified and pass through the windings of magnets 11 and 11'. The current passing through magnet 11 being greater than that passing through magnet 11', the force exerted on armature 12 by magnet 11 will be greater than that exerted by magnet 11' and hence the armature will be attracted toward magnet 11 causing the pointer to move to the upper section of scale 13. This indicates that the sheath of the cable is thicker at the top than at the bottom. The amount that the pointer moves will give an indication of the difference in thickness.

To give a further indication of the eccentricity of the sheath, a signal may be introduced between the amplifiers and rectifiers. This is accomplished by bridging across the outlets of the amplifiers 9 and 9', the primary windings 15 and 15' of a differential transformer 16. The secondary winding 17 of this transformer is connected to any suitable signal which may be either audible or visible. In the drawing, a telephone receiver is indicated. However, a bell or a lamp or both may be inserted in this secondary winding to give the required signal.

The primary windings 15 and 15' are arranged to oppose so that when currents of equal intensities are flowing in these windings, no current is induced in the secondary winding and hence no signal is given. If, however, the cable thickness is not uniform, the current in either primary winding 15 or 15' will be the greater and a current will be induced in the secondary winding. This unbalance is evidenced by either the audible or visible signal.

It is realized that many modifications may be made of the apparatus here shown and still be within the spirit of this invention which is limited only by the scope of the appended claims.

What is claimed is:

1. In combination, a metallic tube, a circuit including a source of alternating current and said tube, exploring coils located in the magnetic field produced thereby, and means connected to said coils for detecting the asymmetry of the thickness of the wall of said tube.

2. In combination, a metallic tube, a circuit including a source of alternating current and said tube, exploring coils located in the magnetic field produced thereby, means for amplifying and rectifying the voltages induced in said coils, and means connected to said coils for indicating the asymmetry in the thickness of the wall of said tube.

3. In a device of the character described, in combination, a metallic tube, means for impressing alternating current on said tube, detecting devices introduced into the magnetic field produced around said tube, and means for determining which of said detecting devices is in the maximum intensity of magnetic field strength.

4. In a device if the character described, in combination, a metallic tube, means for impressing alternating current on said tube, and means for locating the section of greatest magnetic field intensity surrounding said tube.

5. In a device of the character described, in combination, a metallic tube, means for determining the asymmetry of the thickness of the wall thereof comprising an alternating current source connected to said tube, coils located in the magnetic field produced thereby, and an indicating device connected thereto for determining the asymmetry in the wall thickness.

6. In a device of the character described, in combination, a metallic tube, a source of alternating current connected in circuit therewith, detecting coils in the magnetic field produced thereby around said tube, a differentially wound transformer having its primary windings connected to said coils, and an audible signal device connected across the secondary of said transformer.

7. In a device of the character described, in combination, a metallic tube, a source of alternating current connected in circuit therewith, coils in the magnetic field produced thereby around said tube, means for amplifying and rectifying the voltages induced in said coils by said magnetic field, a differential transformer having its primary windings connected to said coils, and an indicator connected to the secondary of said transformer.

8. A method of determining the asymmetry of the wall thickness of a tube comprising passing an alternating current through the tube, inserting detecting devices in the magnetic fields surrounding the tube, and indicating which of said detecting devices is in the maximum strength magnetic field.

9. A method of determining the asymmetry of the wall thickness of a metallic tube comprising passing an alternating current through the tube, inserting coils of wire in the magnetic field surrounding said tube, and determining which of said coils has the larger voltage induced therein.

10. A method of determining the asymmetry of the wall thickness of a metallic tube comprising passing alternating current through said tube, inserting coils of wire in the magnetic field set up by said alternating current around said tube, amplifying and rectifying the voltages induced in the coils of wire, passing the resultant currents through electromagnets exerting differential attractive forces on a common armature, and indicating which of said electromagnets exerts the greatest force on said armature, and indicating also the amount by which the force exerted by one electromagnet exceeds the force exerted by the other.

In witness whereof, I hereunto subscribe my name this 17th day of April, A. D. 1925.

FRANCIS A. HUBBARD.